(12) United States Patent  (10) Patent No.: US 8,082,973 B2
Sun  (45) Date of Patent: Dec. 27, 2011

(54) METHOD AND DEVICE FOR CORE PULLING AND INSERTION IN SYNCHRONIZATION WITH THE OPENING AND CLOSING OF THE MOLD

(76) Inventor: Jinjun Sun, Zhejiang (CN)

( * ) Notice: Subject to any disclaimer, the term of this patent is extended or adjusted under 35 U.S.C. 154(b) by 549 days.

(21) Appl. No.: 12/091,556

(22) PCT Filed: May 22, 2006

(86) PCT No.: PCT/CN2006/001060
§ 371 (c)(1),
(2), (4) Date: Apr. 25, 2008

(87) PCT Pub. No.: WO2007/048291
PCT Pub. Date: May 3, 2007

(65) Prior Publication Data
US 2008/0257520 A1    Oct. 23, 2008

(30) Foreign Application Priority Data

Oct. 25, 2005  (CN) .......................... 2005 1 0061250

(51) Int. Cl.
B22D 33/04 (2006.01)
B22D 17/24 (2006.01)
B22D 29/00 (2006.01)
(52) U.S. Cl. ......... 164/137; 164/340; 164/132; 164/345
(58) Field of Classification Search .................. 164/137, 164/340, 132, 345
See application file for complete search history.

(56) References Cited

U.S. PATENT DOCUMENTS 4,427,355 A * 1/1984 Vatterott ....................... 425/156
5,135,700 A * 8/1992 Williams et al. .............. 264/318
5,937,930 A * 8/1999 Nakamura et al. ............ 164/112

* cited by examiner

Primary Examiner — Kevin P Kerns

(57) ABSTRACT

A method for core pulling and insertion in synchronization with the opening and closing of the mold in a cavity including a fixing half and a moving half, or a fixing half, a moving half and several cavity plates installed between fixing half and moving half as well as the core moving reciprocally inside the cavity, wherein a downward movement of a transmission gear is coupled with an opening of the mold, synchronous with a pulling of the core out of the cavity, and an upward movement of the transmission gear is coupled with a closing of the mold, synchronous with an insertion of the core into the cavity.

1 Claim, 5 Drawing Sheets

METHOD AND DEVICE FOR CORE PULLING AND INSERTION IN SYNCHRONIZATION WITH THE OPENING AND CLOSING OF THE MOLD

BACKGROUND OF THE INVENTION (a) Field of the Invention

The invention is related to machines in injection molding and die casting, and is especially related to a method for core pulling and insertion in synchronization with the opening and closing of the mold as well as the apparatus to realize the said method in the molding process.

(b) Description of the Prior Art

The core pulling and insertion method and device used in the injection molding and die casting production process have been through changes. The conventional core pulling and insertion method for injection molding adopts a leaning guide post core pulling and insertion method, whereof as the leaning guide post has a longer translation distance in working but has a shorter stroke in actual core pulling and insertion due to its inherited structure, lowering work effectiveness and increasing cost. Hence, based on this, a method such as the mold external hydraulic/pneumatic cylinder actuated core pulling and insertion is employed as an improvement, similar to this technology includes the publicized application of the Chinese patent no. 200510049399.3' A demolding device for the mold with a side core extraction and extrusion mechanism which discloses that the top of the fixing plate at one side of the mold is installed with a hydraulic cylinder which is through the work table of the press or injection molding machine to allow the piston rod of the said hydraulic cylinder to connect with the mold push rod, so that the said push rod is independently controlled by the installed hydraulic cylinder instead of interlinking with the work table of the press; thereby it effectively resolves the shortened stroke of molding core pulling and insertion problem and also has a higher work effectiveness compared with the afore mentioned technology. Nonetheless, both of the said methods have a the same imperfection, i.e. the opening and closing of the mold as well as the core pulling and insertion are separate actions which can only be operated manually, and due to inadequacy of automation, mis-operation may occur easily to damage the molds. Therefore, they shall be replaced, and a method and device for the molding core pulling and insertion with a higher degree of automation is urgently needed to be researched and developed for the replacement. The above said two methods of existing arts have another imperfection of unable to randomly set the stroke of core pulling and insertion according to requirement of workpiece that needs to be further improved.

SUMMARY OF THE INVENTIONS

The purpose of the invention is to disclose a method and device, in which the core pulling and insertion with random strokes setting is synchronized with the opening and closing of the mold, i.e. a method and device for core pulling and insertion in synchronization with the opening and closing of the mold.

The technical method for the invention is realized as follows:

A method for core pulling and insertion in synchronization with the opening and closing of the mold which is used in a cavity constituted by a fixing half and a moving half, or a cavity constituted by a fixing half, a moving half and several cavity plates installed between fixing half and moving half as well as the cores moving reciprocally inside the cavity, wherein it is characterized to be completed by the following steps:

(1) In mold opening, the core lock piece opening stroke is preset.

(2) In mold opening, moving half driving the core lock piece travels the stroke said in step (1) to open until reaching either limit of gear rack or gear chain, whereby the hook reaches the position to start core pulling.

(3) The moving half continue to travel until mold opening completed, the mold push rod is acted to complete demolding.

(4) In mold closing, moving half driving hook travels reversely to drive core to insert until reaching either limit of gear rack or gear chain and unlocking hook lock. The moving half driving the core lock piece travels the stroke said in (1) and then locks the core to prepare for mold opening after casting.

(5) Repeat the steps (1) to (4).

The above said method for core pulling and insertion in synchronization with the opening and closing of the mold is characterized in that the gear chain used in step (4) is a linear chain.

The above said method for core pulling and insertion in synchronization with the opening and closing of the mold is characterized in that in the process of steps (2) to (4), the stroke of core pulling and insertion is adjusted by number of teeth of the gear engaged with the gear train.

The above method for core pulling and insertion in synchronization with the opening and closing of the mold is characterized in that in the process of steps (2) to (4), the angle between the core and the cavity can be arbitrarily set to any angle according to workpiece requirement.

To realize the said method, the following is disclosed:

A device for core pulling and insertion in synchronization with the opening and closing of the mold is comprised of a cavity constituted by a fixing half and a moving half, or a cavity constituted by a fixing half, a moving half and several cavity plates installed between fixing half and moving half as well as the cores moving reciprocally inside the cavity, wherein it is characterized in that: one side of the moving half is installed with the guide press piece to match with the core, the gear spindles are firmly installed between the two guide press pieces, the pulling and insertion gear installed on the spindle is engaged with the transmission rack which is affixed with the core. The transmission gear installed on the spindle is engaged with the gear rack or gear chain installed outside the mold, and the hook installed on above the gear rack or gear train is engaged with the hook lock.

The said fixing half is affixed with the core lock piece to fit with the concaved slot of core.

The chute is installed on the said core to fit with guide rail of the guide press piece.

The lock head of said hook lock is connected with a spring which is affixed to the exterior of the mold.

The invention discloses to utilize the mechanical opening and closing of the mold in injection molding machines and presses to synchronously complete the demolding core pulling and core insertion work for the products, thereby the clogging problems in the 45-degree angle core pulling and insertion hydraulic cylinder, injection molding machines and the four guiding cylinders of the press as well as the safety door closing and clogging problems in injection molding machines and presses due to long hydraulic cylinder can be solved by the said invention to provide for continuous production and process control. It has a simple structure with compact, precise and reliable in stable operation characteristics, whereby to provide an automatic equipment for safety production and environmental protection.

DETAILED DESCRIPTION OF THE PREFERRED EMBODIMENTS

Figure 1:
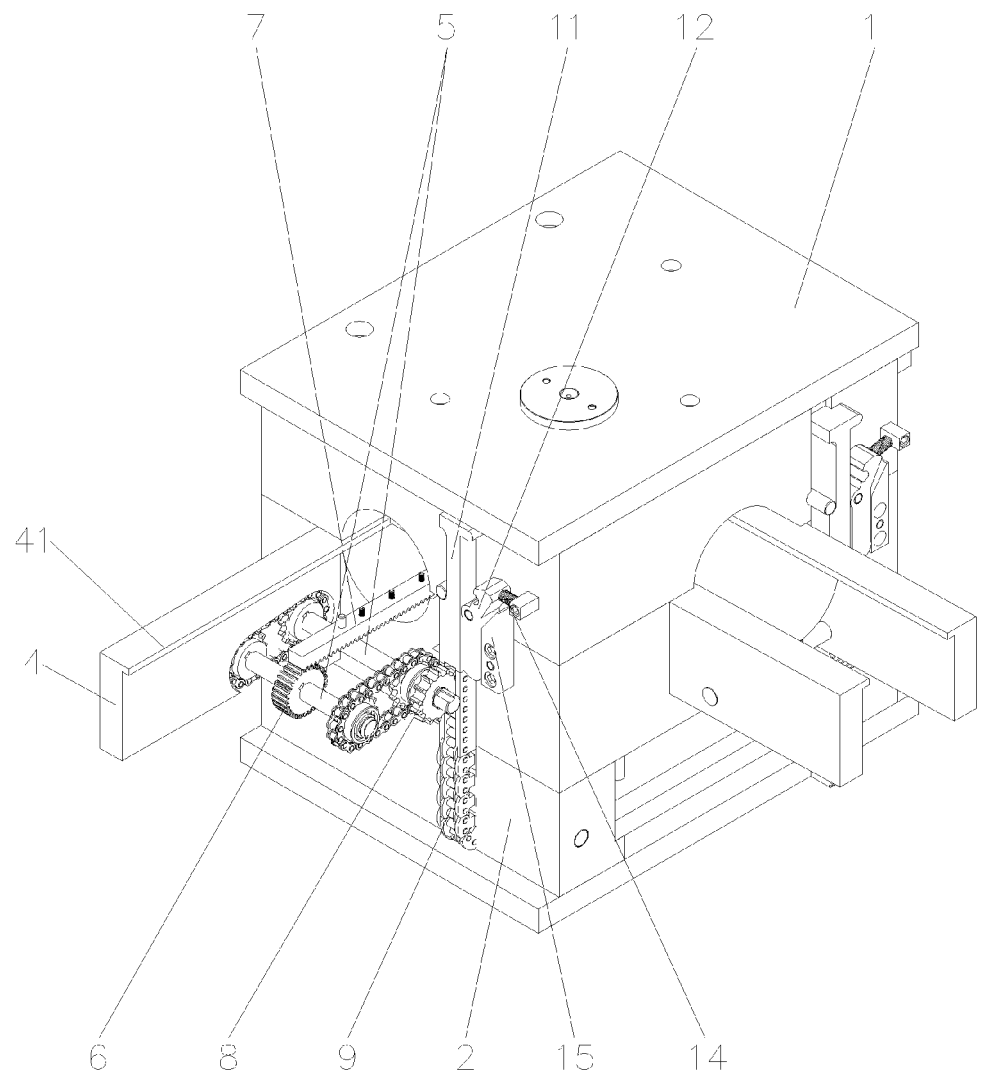
FIG. 1 is a partial 3D structural diagram of the invented device
Figure 2:
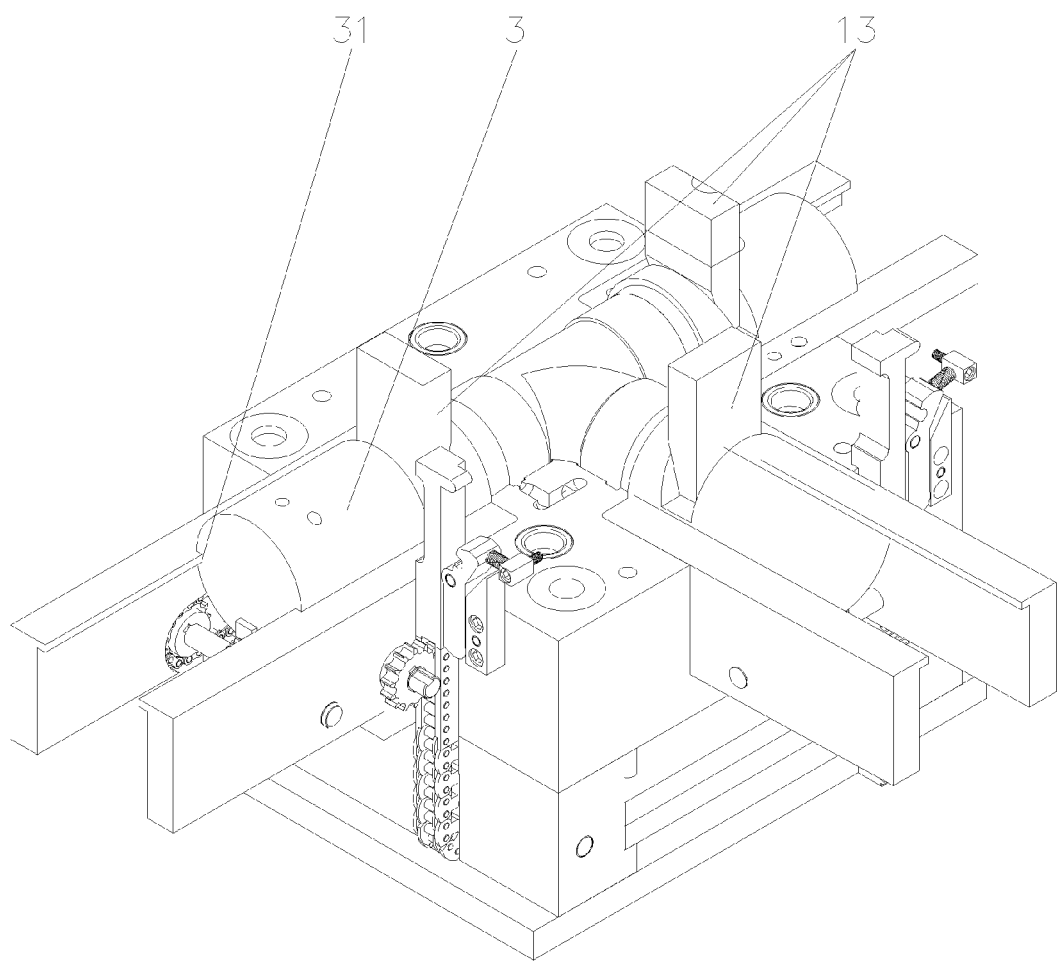
FIG. 2 is a partial 3D structural diagram of the invented device after removing the fixing half.

The embodiment of the invention is described in the following along with the attached drawings:

Please refer to FIGS. 1 to 4, a core pulling and inserting device in synchronization with the opening and closing of the mold is comprised of a cavity constituted by a fixing half 1 and a moving half 2, or a cavity constituted by a fixing half 1, a moving half 2 and several cavity plates installed between fixing half 1 and moving half 2 as well as the core 3 which are moving reciprocally inside the cavity, whereof one side of the moving half 2 is installed with a guide press piece 4 to match with the core 3, the gear spindles 5 are firmly installed between the two guide press pieces 4, the core pulling and insertion gear 6 installed on the spindle 5 is engaged with the transmission rack 7 which is affixed with the core 3, or the core pulling and insertion gear 6 can also be designed to engage with core 3 directly. The transmission gear 8 installed on the spindle 5 is engaged with the gear rack 9 or gear chain 10 installed outside the mold, and the hook 11 installed on above the gear rack 9 or gear train 10 is engaged with the hook lock 12. Thereof, the gear chain arrangement allow the core 3 to be pulled out when the moving half 2 is opened and allow the core 3 to be inserted when the mold is closed. As shown in FIG. 1, the gear train is constituted by the four gears interconnected through the spindles 5 within the open space between the two guide press pieces 4, one of the gears is engaged with the transmission gear to form a synchronization, i.e. when the transmission gear 8 is moved downwards, the four gears then drive the core 3 which is connected with spindles 5 to pull outwards, when the mold is closing, the transmission gear 8 is moved upwards, the four gears then drive the core 3 to insert inwards.

Figure 5:
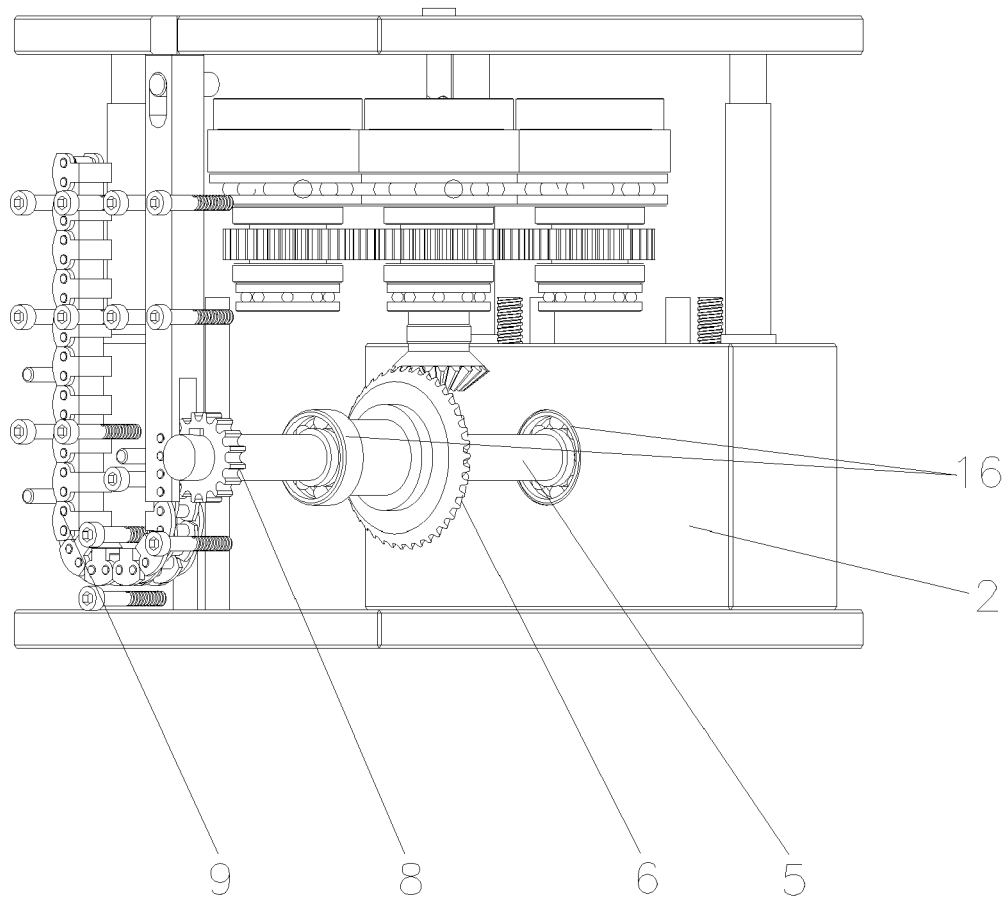
FIG. 5 is a partial 3D structural diagram of another embodiment of the invention.

Please refer to FIG. 5, whereof the gear trains in FIG. 1 can be replaced by a bearing 16 installed on the guide press piece 4 to allow the spindle 5 to be connected with the bearing 16, while the outer ring of the bearing 16 is firmly fixed inside the guide press piece 4.

Through the above installed core pulling and inserting device in synchronization with the opening and closing of the mold, the fixing half 1 is affixed with the core lock piece 13 to fit with the concaved slot of core 3 to ensure fixation of the core for casting products. In mold closing, the core lock piece 13 is inserted into the concaved slot for locking; and in mold opening, the core lock piece 13 is pulled out of the concaved slot for unlocking.

Through the above installed core pulling and inserting device in synchronization with the opening and closing of the mold, the chute 31 is installed on the said core 3 to fit with guide rail 41 of the guide press piece 4, thereby to allow the core 3 to translate reciprocally on the guide press piece 4.

Through the above installed core pulling and inserting device in synchronization with the opening and closing of the mold, the lock head 121 of said hook lock 12 is connected with a spring 14 which is affixed to the exterior of the mold. The function of spring 14 is to un-constrain hook 11 from constraint piece 15 when the mold closing reach to limits of either the gear rack 9 or gear chain 10.

A method to produce products by the said device is disclosed:

(1) In mold opening, the core lock piece 13 opening stroke is preset: i.e. the distance after unlocking hook 11 from the hook lock 12.

(2) In mold opening, moving half 2 driving the core lock piece 13 travels the stoke said in step (1) to open until reaching either limit of gear rack 9 or gear chain 10, whereby the hook 11 reaches the position to start core 3 pulling.

(3) The moving half continue to travel until mold opening completed, the mold push rod is acted to complete demolding.

(4) In mold closing, moving half 2 driving hook 11 travels reversely to drive core 3 to insert until reaching either limit of gear rack 9 or gear chain 10 and unlocking hook lock 12. The moving half 2 driving the core lock piece 13 travels the stroke said in (1) and then locks the core 3 to prepare for mold opening after casting.

(5) Repeat steps (1)-(4).

The gear chain 10 used in the method is in linear shape, and it also can be directly replaced by the gear rack 9. The gear rack 9 can be used for short core pulling and insertion stroke and gear chain 10 can be used for long core pulling and insertion stroke, thereby the said device has a wider range of application.

Figure 3:
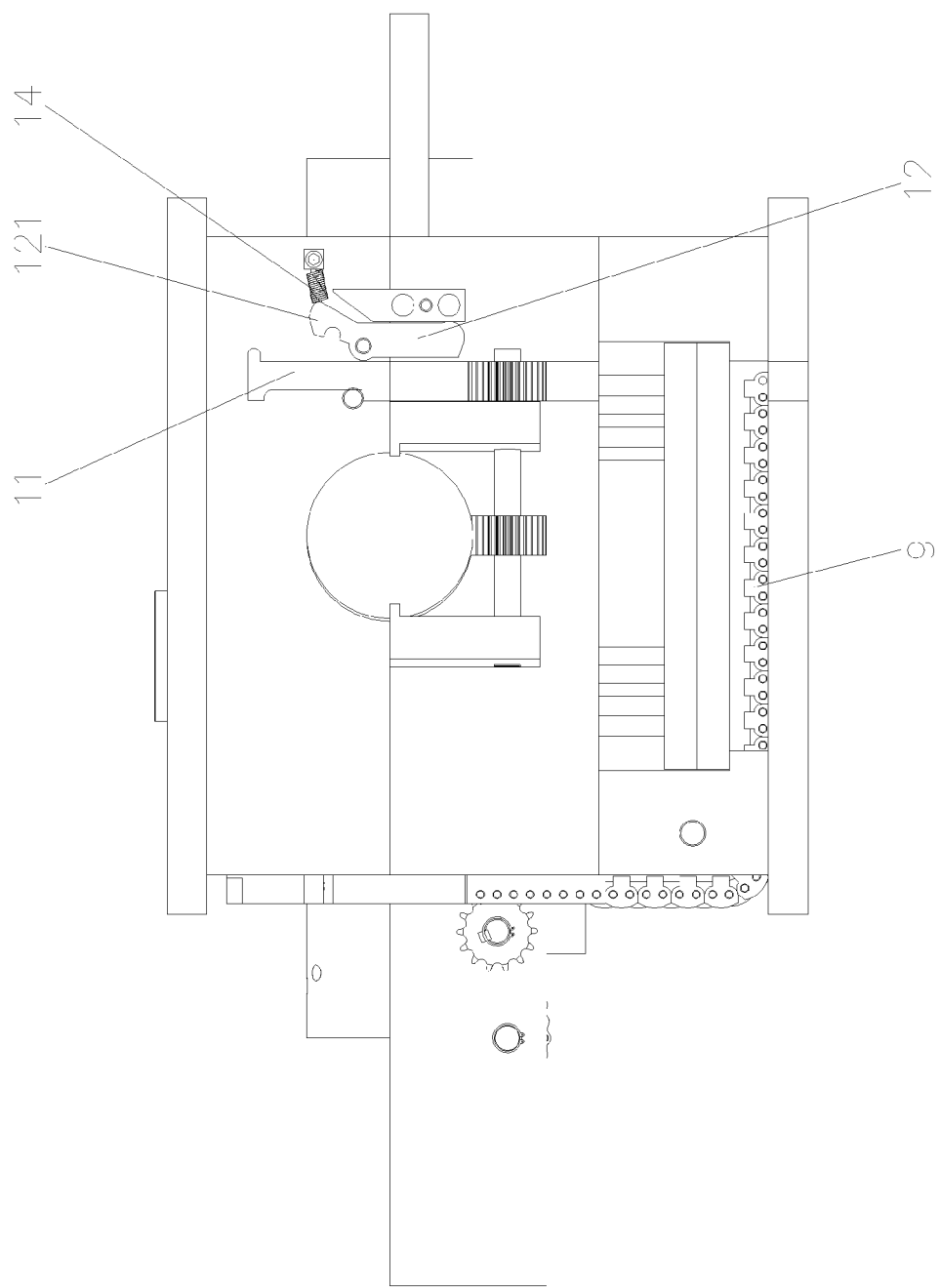
FIG. 3 is a plane layout of the gear train portion of the invented device.
Figure 4:
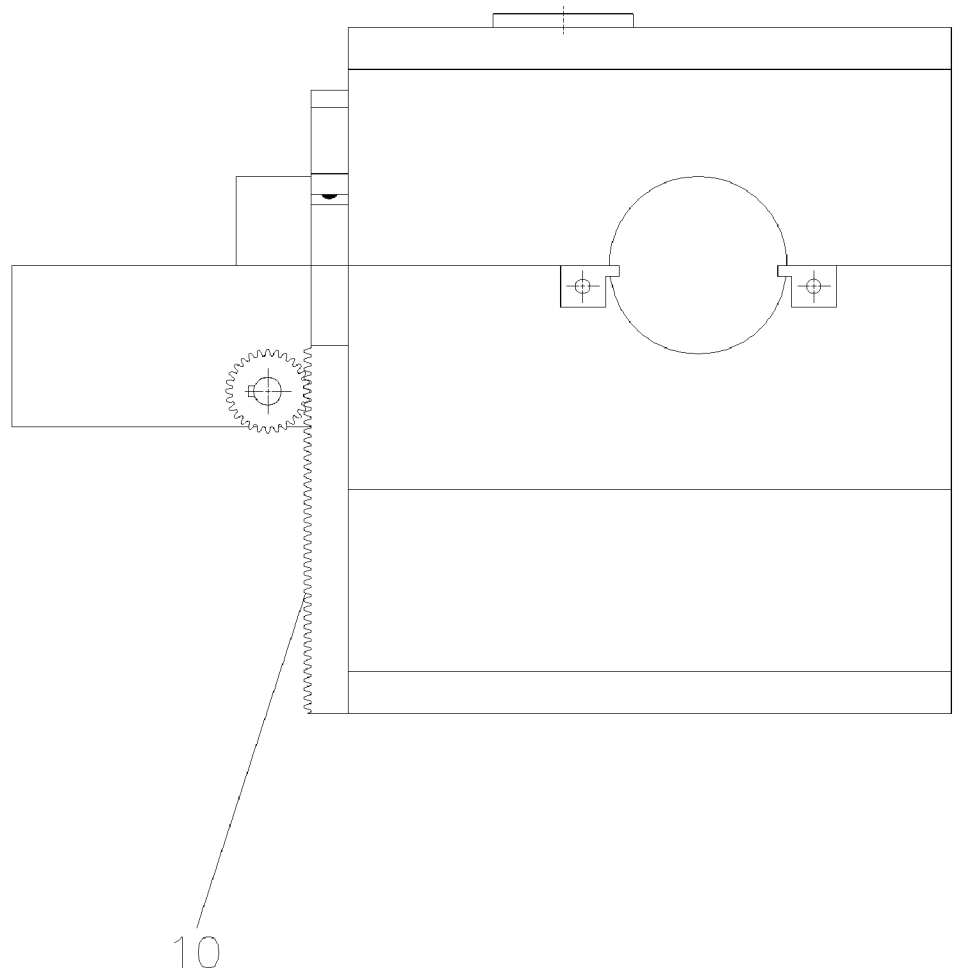
FIG. 4 is a plane layout of the rack gear portion of the invented device.

As shown in FIG. 3, the gear chain 10 is used for long core pulling and insertion stroke, partial chain of gear chain 10 is placed between the mold push rod and base plate of the moving half 2.

One part of the method is that the core pulling and insertion stroke is adjusted through the gear engaged with the gear chain 10, such as by adjusting number of teeth of the core pulling and insertion gear 6 or of the transmission gear 8.

One part of the method is that the angle between the core 3 and the cavity can be arbitrarily set to any angle according to workpiece requirement in order to satisfy the requirements of core pulling and insertion in abnormal conditions.

FIG. 5 shows another embodiment of the invention:

A device for core pulling and insertion in synchronization with the opening and closing of the mold is mainly used to produce piping covers, in which as compared with the aforesaid embodiments of the invention, only one spindle 5 is needed to install, the gear inside the guide press piece 4 of the gear chain is replaced by the bearing 16 installed on the pad of moving half 2, the transmission gear 8 on the spindle 5 is engaged with the gear chain 9, the core pulling and insertion gear 6 is not engaged with the round gear shown in FIG. 1 but changed to engage with the cone gear instead, so that the linear core pulling and insertion movement is changed to be driven by the helical screw movement.

A piping cover manufacturing method by the device shown in FIG. 5 is described below:

(1) In mold opening, the stroke after unlocking the hook 11 from the hook lock 12 is preset: i.e. setting required pipe cover demolding distance. The linear length setting to position core 3 by the core lock piece 13 is changed to axial positioning by helical screw which is a common method used in the same field.

(2) In mold opening, moving half 2 driving the core lock piece 13 travels the stoke said in step (1) to open until reaching either limit of gear rack 9 or gear chain 10, whereby the hook 11 reaches the position to start core 3 pulling.

(3) The moving half continue to travel until mold opening completed, the demolding is completed and the piping cover is screwed out. Similarly, after the linear length setting to position core 3 by core lock piece 13 is changed to axial positioning by helical screw, the said mold push rod demolding is replaced by the helical screw demolding.

(4) In mold closing, moving half 2 driving hook 11 travels reversely to drive piping cover type core to insert until reaching either limit of gear rack 9 or gear chain 10 and unlocking hook lock 12. The moving half 2 travels the stroke said in (1) and then locks the core to prepare for mold opening after casting.

(5) Repeat steps (1) to (4).

The invention can applied in a wide field, the transfer piping manufacture is related to applications in every field. The size of the mold and die device can be correspondingly designed according to the required specifications of the products. Especially, the methods of the invention such as the core pulling and inserting in synchronization with the opening and closing of the mold of the invention, gear driven core pulling and insertion, and core pulling and insertion stroke presetting in the mold opening and closing process are all essences of the invention, they are all belong to the protected range of the invention.

All components of the said device are made of metal material

I claim:

1. A method for pulling and inserting a core (3) with concave slots in synchronization with the opening and closing of a mold in a cavity including a fixing half (1) and a moving half (2), or a cavity including a fixing half (1), a moving half (2) and several cavity plates installed between the fixing half (1) and moving half (2) as well as the core (3) moving reciprocally inside the cavity, including:

step (1): prior to mold opening, a stroke is preset as a displacement of a hook (11) in disengaging from the hook lock (12) affixed to the fixing half (1) for unlocking core lock pieces (13) from the concave slots of the core (3);

step (2): synchronous mold opening and core pulling, the moving half (2) unlocks the core lock pieces (13) from the concave slots of the core (3) fixed with a gear spindle (5) of a gear train, and moves in the stroke preset in step 1) until a limit of a gear rack (9) or a gear chain (10) disposed over the hook (11) is reached, while, synchronously, a downward movement of a transmission gear (8), engaged with the gear rack (9) of the gear chain (10), drives a gear of a transmission train to move the gear spindle (5), which pulls out the core (13) in two guide press pieces (4) disposed on a side of the moving half (2) via a core pulling and insertion gear (6) of the gear spindle (5), or via a transmission rack (7) affixed directly with the core (3);

step (3): completing mold opening:

the moving half (2) continues to travel until a mold push rod is activated;

step (4): synchronous mold closing and core insertion:

the moving half (2) drives the hook (11) to travel reversely to drive the core (3) for an insertion into the cavity until reaching either the limit of the gear rack (9) or the gear chain (10) and unlocking the hook lock (12), the transmission gear (8) moves upwards; and the core lock pieces (13) travel in the stroke preset in step (1) and then locks the core (3) with core lock pieces (13) engaging concave slots of the core (3) to prepare for mold opening after casting, step (5) repeat the steps (1)-(4).

\* \* \* \* \*